March 5, 1946.  G. H. FOSTER ET AL  2,395,859
PREPARATION OF CRYSTALLINE MATERIALS
Filed Nov. 5, 1943
Fig. 1.
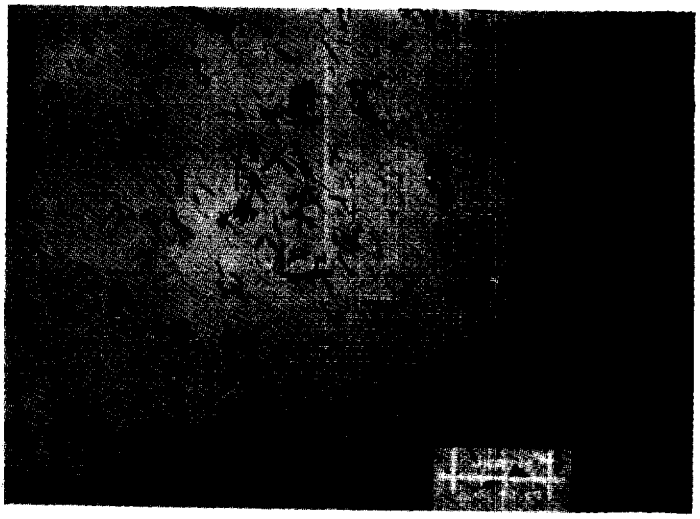
Fig. 2.
INVENTORS
GEORGE H. FOSTER,
EMIL F. WILLIAMS,
BY Frank J. Novotny
ATTORNEY Patented Mar. 5, 1946

2,395,859

UNITED STATES PATENT OFFICE 2,395,859

PREPARATION OF CRYSTALLINE MATERIALS

George H. Foster, Niagara Falls, N. Y., and Emil F. Williams, Old Greenwich, Conn., assignors to American Cyanamid Company, New York, N. Y., a corporation of Maine Application November 5, 1943, Serial No. 509,044

3 Claims. (Cl. 260—564)

This invention relates to a process for preparing crystalline and crystallizable substances in a very fine state of subdivision, and contemplates such improvements and refinements in the production of such substances as result in a product having certain highly desirable properties and characteristics. More particularly it embraces the production of nitroguanidine and similar substances in an extremely minute crystalline state. This is a continuation-in-part of our co-pending application, Ser. No. 417,064, filed October 30, 1941.

Heretofore it has been difficult and frequently impossible to prepare such crystalline substances as, for example, nitroguanidine in the form of discrete crystals of a size less than about 15 microns in width or less than about 300 or 400 microns in length. The usual methods of crystallization or recrystallization, even when supplemented by subsequent grinding or ball-milling in a porcelain mill ordinarily result in the production of much larger crystalline structures. Moreover, the grinding of such materials as are explosive in nature is a distinct hazard both to the workmen engaged therein and to the plants carrying out the process. In addition, however, such grinding simultaneously effects but a slight decrease in particle size.

It is an object of this invention to provide a method for the production of nitroguanidine of extremely small size in an efficient and economical manner. A further object is to prepare nitroguanidine in the form of small and uniformly very fine crystals. More specifically, it is an object of this invention to control the crystal habit, particularly the size, shape and form of crystals of nitroguanidine and to provide certain improved methods for the manufacture of nitroguanidine which facilitate the obtainment of a product having a novel and desirable crystal habit. It is also an object hereof to obtain, with the aid of a chemical modifier, crystals of nitroguanidine which are smaller and finer than those ordinarily obtained in the course of a conventional physical crystallization. A further object is to provide a method wherein, by the addition of a wetting agent or dispersing agent before the final drying step, the ultimate individual crystals are obtained in such a state as to be free from branching and aggregation and remain as separate particles when stored for prolonged periods in the dry state. Still other and further objects will become apparent upon reading the following description wherein a number of specific embodiments of the invention are given.

This invention is based principally upon the discovery that a coating or shell is formed by an included amino or similar nitrogen containing compound, on and about the minute nucleus of a precipitated crystalline substance, such as nitroguanidine, immediately upon precipitation or formation from its solutions provided small amounts of such an amino or similar nitrogen containing compound are present in solution during the precipitation.

The best conditions for the physical crystallization of soluble materials such as nitroguanidine have heretofore been attained by preparing a saturated solution of the nitroguanidine in hot water and then suddenly cooling the solution as by spray cooling, chilling, or discharging it into an ice cold liquid or by utilizing equivalent means for cooling the nitroguanidine solution. This invention embodies the addition of a small amount of a foreign substance, such as an amino or similar nitrogen containing compound, to the hot aqueous solution of nitroguanidine before its crystallization, and precipitating the solute therefrom in the form of a pure nitroguanidine in such a fine degree of subdivision has has been impossible to obtain heretofore, by the conventional methods.

In its broadest aspects, the method herein disclosed contemplates the modification of crystal habit, particularly particle size, by the addition of any one of a number of different foreign substances to a solution of nitroguanidine before recrystallization and allowing this additive to remain in solution during the recrystallization. Such a method can be carried out in accordance with the principles of this invention by rapidly cooling a saturated solution of nitroguanidine to which has been added a small amount of a modifying compound or addition agent, e. g. 1% of a material containing an amino or a similar nitrogen containing group such as ethylene diamine, diethylene triamine, triethylene tetramine, and tetraethylene pentamine; amino acids, including glue, casein and the like. In addition to the above substances a synthetically prepared wetting agent also preferably containing an amino group, such as lauryl biguanide acetate; 1,3-diethylol, 5-butyl biguanide diacetate, monoethyl cyanamide condensed with ethylene diamine; acylated amides of polyethylene polyamines and the like, among others, may be used as the addition agent.

More particularly, it has been found that nitroguanidine crystals having a thickness of less than 5 microns and a length of less than 100 microns can be prepared by the addition of triethylene tetramine to a nitroguanidine solution in an amount of 0.3% based on the total solution. Similar effects can be obtained by the addition of about 0.6% of ethylene diamine, diethylene triamine, and tetraethylene pentamine, individually or as a mixture. In their order of effectiveness for the purposes of this invention these individual compounds may be tentatively arranged in the following sequence: diethylene > triethylene tetramine > tetraethylene pentamine. The addition of ethylol dodecyl biguanide acetate up to about 1.0% is also effective. Optimum results are obtained when the pH of the solution is adjusted to about 8. Preferably, acetic acid can be used to attain this pH after the addition of the particular modifying agent.

In some instances the use of individual additives has been found to yield a crystalline product which may necessitate additional processing. Thus, for example, ethylene diamine may result in a product which dries to form hard lumps or aggregates which are not readily broken up by micropulverizing. However, such lumps are easily eliminated by washing the crystals with water containing about 0.1% of ethanol dodecyl biguanide acetate or a similar wetting agent.

Although it is not desired to be limited by any theory as to the mode of operation of the additives disclosed in this invention when used for the formation of such discrete and small crystalline precipitates, it is believed that the modifying compound shows preferential adsorption on certain crystallographic planes, covering portions or all of the external surface of each crystal nucleus as formed. This adsorbed material effectively prevents further crystal growth as by accretion on the first formed crystal nucleus. Furthermore, there is a possibility that the solubility of the nitroguanidine at the crystallization temperature is decreased by the addition agent. This increases the number of crystal nuclei formed and correspondingly decreases their size. As a result of the addition of the above modifying compounds to a hot aqueous solution of nitroguanidine of about 7.5% concentration and subjecting the solution to a subsequent very rapid cooling, as by spraying or otherwise cooling the same, crystals of nitroguanidine having a size of the order of 2.5 microns in width and 20 microns in length are obtained. An additional advantage of the process of this invention is found in that the product thus prepared is far more stable than a similar product crystallized in the absence of such a modifying compound. This may be attributed to the addition of amines which effectively neutralize any acidity developed in the nitroguanidine as a result of its decomposition during storage. This stability is due principally to the fact that the fine crystals of nitroguanidine contain minute amounts of the addition agent. Depending on the addition agent used, the crystals can be rendered more or less readily dispersible in water or other media.

The improvements and advantages of the present invention are more readily appreciated when considered in conjunction with the appended microphotographs, in which:

Fig. 1 is a reproduction of a photomicrograph of nitroguanidine crystals prepared without a modifier and more particularly referred to in Example 3; and Fig. 2 is a reproduction of a photomicrograph of nitroguanidine crystals prepared in accordance with the method described below in Example 2.

The careful comparison, microscopical and otherwise, of the products prepared in several different ways shows clearly the superiority of nitroguanidine prepared by the methods of this invention, particularly for nitroguanidine which is to be incorporated in propellant powders. Moreover, when prepared as herein described, a more uniform product is obtained, very little variation being exhibited from the maximum to the minimum crystal size.

The following examples are included herein in order to facilitate a more complete understanding of the invention. A number of variations in the process are included below in order to illustrate the extended scope of the procedure herein disclosed.

EXAMPLE 1

7 grams of coarse crystalline nitroguanidine was dissolved in about 100 cc. of water. Small portions of this solution, about 2 to 4 cc., were withdrawn and mixed in a test tube with 1 to 3%, based on the nitroguanidine present, of triethylene tetramine. The test tube was immersed in a beaker of boiling water until the nitroguanidine was completely dissolved. A portion of this solution was poured into a test tube containing dry ice. The precipitated crystalline nitroguanidine was examined microscopically in order to measure the length and cross-section of its individual crystals. The resultant crystals were predominantly of a very small size, namely about 2.5 microns wide by about 20 microns long.

EXAMPLE 2

An aqueous solution of nitroguanidine of about 7.5% strength was prepared and from 0.3 to 3%, preferably about 1%, of a modifying agent, such as triethylene tetramine, was added. This solution was heated in an autoclave to about 100° C. in an enclosed spray chamber. The precipitate formed was examined microscopically and showed a decided increase in the proportion of nitroguanidine crystals about 2.5 microns in width by about 20 microns in length as compared to nitroguanidine precipitated from a similar solution but which, however, was prepared without the addition of the particular modifying agent above. The latter crystals were about 5 x 150 microns in size.

As an alternative method, seven grams of coarsely crystalline nitroguanidine were dissolved in about 100 cc. of water. A sample comprising about 4 cc. of this solution was withdrawn and mixed in a test tube with about 1% (based on the nitroguanidine) of triethylene tetramine. The test tube was immersed in a beaker of boiling water until the nitroguanidine was completely dissolved. A portion of this solution was poured into a test tube and cooled. Extremely small crystals of nitroguanidine measuring less than approximately 2.5 x 75 microns were obtained.

In the following examples an aqueous solution of nitroguanidine of 7.5% strength was prepared and, after adding the modifier indicated, the solution was heated to a temperature of 102 to 105° C. and spray cooled from a blowcase under a pressure of 100 pounds per square inch.

| Example | Modifier | Particle size by number percent of total | | | | | |
|---|---|---|---|---|---|---|---|
| | | Width | | | Length | | |
| | | <2.5μ | 2.5-5.0μ | >5.0μ | <50μ | 50-100μ | >100μ |
| 3 | None ("blank") | 30.7 | 47.7 | 21.6 | All about 150. | | |
| 4 | 1.0% ethylol dodecyl biguanide acetate | 79.4 | 20.6 | 0.0 | 76.1 | 23.9 | 0.0 |
| 5 | 0.6% {Diethylene triamine, Triethylene tetramine, Tetraethylene pentamine} | 97.5 | 2.5 | 0.0 | 94.0 | 6.0 | 0.0 |
| 6 | 0.4% ethylene diamine | 99.9 | 0.1 | 0.0 | 99.2 | 0.8 | 0.0 |
| 7 | 0.3% ethylene diamine | 85.9 | 14.1 | 0.0 | | | |
| 8 | 0.3% ethylene diamine | 87.4 | 12.4 | 0.2 | 93.5 | 6.5 | 0.0 |
| 9 | 0.32% ethylene diamine | 88.6 | 11.2 | 0.2 | 90.1 | 9.8 | 0.0 |

These examples indicate that the percentage of crystals less than 2.5 microns wide by actual count was increased from 30.7 for the unmodified or "Blank" example to approximately 90 or more by the use of triethylene tetramine. The mixed amines were almost as effective but required about twice as much modifier.

In the following examples each run consisted of a charge of 20.5 pounds of crude nitroguanidine and 275 pounds of water mixed in an autoclave at 100° C. The solution was then transferred to a blowcase and sprayed through ⅛ inch jets into an enclosed spray chamber containing a circulating charge of 300 pounds of water. In order to accelerate the cooling of the batches to 25° C., air was drawn through the chamber at the rate of 600 cu. ft. per minute. The temperature of the blowcase was held at 102°–105° C. and the spraying pressure was maintained at 100 pounds per square inch. In each run, the crystal size was varied by the use of ethylene diamine of the strength indicated. This was added to the charge and to the bath. The pH of the charge was adjusted with acetic acid after the addition of the ethylene diamine. The precipitated nitroguanidine was separated from the residue by centrifugal action or by filtration and the crystalline product was subsequently washed with water alone or, preferably, with water containing 0.1 per cent of ethylol dodecyl biguanide acetate.

The residual mother liquor from each run was used to make up the next charge and batch, sufficient water and ethylene diamine being added to compensate for that lost in the recrystallization and by evaporation.

EXAMPLE 10

Batch 1

[Width of crystals <4 microns]

| Run No. | Weight of ethylene diamine used | Per cent ethylene diamine | pH | Weight of nitroguanidine |
|---|---|---|---|---|
| | Gr. | | | Lbs. |
| 44 | 1,041 | 0.4 | 7.5 | 10 |
| 45 | 278 | 0.4 | 7.5 | 9 |
| 46 | 250 | 0.4 | 7.0 | 17 |
| 47 | 238 | 0.4 | 7.0 | 5 |
| 48 | 375 | 0.4 | 7.0 | 15 |
| 50 | 401 | 0.4 | 7.0 | 14 |
| 52 | 286 | 0.4 | 7.5 | 17 |
| 53 | 346 | 0.4 | 7.5 | 17 |
| 54 | 525 | 0.4 | 8.0 | 10 |
| 55 | 329 | 0.4 | 8.0 | 10 |
| 60 | 433 | 0.45 | 8.0 | 15 |
| Total | 4,502 | | | 129 |

EXAMPLE 11

Batch 2

[Width of crystals <3 microns]

| Run No. | Weight of ethylene diamine used | Per cent ethylene diamine | pH | Weight of nitroguanidine |
|---|---|---|---|---|
| | Gr. | | | Lbs. |
| 56 | 364 | 0.4 | 8.0 | 30 |
| 57 | 333 | 0.4 | 8.0 | |
| 61 | 220 | 0.45 | 8.0 | 11 |
| 62 | 584 | 0.45 | 8.0 | 11 |
| 63 | 349 | 0.45 | 8.0 | 12 |
| 64 | 259 | 0.45 | 8.0 | 11 |
| 65 | 328 | 0.45 | 8.0 | 15 |
| 66 | 203 | 0.45 | 8.0 | 14 |
| 67 | 376 | 0.45 | 8.0 | 14 |
| Total | 3,016 | | | 118 |

By actual microscopical count the percentage of crystals varying in width from <1 micron to <5 microns was as follows:

| <1 | <2 | <3 | <5 |
|---|---|---|---|
| 76.8 | 98.0 | 99.9 | 100.0 |

EXAMPLE 12

Batch 3

[Width of crystals <5 microns]

| Run No. | Weight of ethylene diamine used | Percent ethylene diamine | pH | Weight of nitroguanidine |
|---|---|---|---|---|
| | Gr. | | | Lbs. |
| 49 | 253 | 0.4 | 7.0 | 17 |
| 51 | 286 | 0.4 | 7.0 | 15 |
| 54 | 525 | 0.4 | 8.0) | |
| 55 | 329 | 0.4 | 8.0) | 15 |
| 58 | 0.00 | 0.3 | 8.0) | 3.0 |
| 59 | 3.64 | 0.4 | 8.0) | |
| 68 | 81 | 0.3 | 8.0 | 16 |
| 69 | 182 | 0.3 | 8.0 | 16 |
| Total | | | | 109 |

In addition to the preparation of nitroguanidine in the form of very finely divided discrete crystals by the process of this invention, various other substances can be prepared in a similarly minute crystalline condition. Thus mercury fulminate, lead azide, nitro amino guanidine and its salts, as well as picric acid, tetranitraniline and the like, can be prepared and a definite control of their minute crystalline shape, size and form can be effected with the aid of the various modifiers of crystal habit herein described.

Various methods can be used to effect the desired crystallization. For example, spray cooling chambers may be utilized for spraying the solution in the form of fine streams into, or preferably under, an ice-water bath are among various other methods which can be used for the sudden cooling or chilling of solutions in order to precipitate the solute in finely divided form.

The very fine crystalline materials thus prepared find use in the manufacture of explosives. For example, a more highly effective type of explosive, namely a more powerful cordite, is obtained when such very fine crystals of nitroguanidine are used as can be prepared in accordance with the principles of this invention.

In particular, the use of such small crystals of nitroguanidine as above prepared in plastic cordite results in a greatly accelerated rate of propagation of the flame upon explosion and, moreover, it has been found that the oxidation of cordite is directly dependent upon the degree of subdivision of the crystalline nitroguanidine used. Thus, it has been definitely established that the small crystals of nitroguanidine produced in accordance with this invention are far more desirable for incorporation in cordite than the larger crystals heretofore used.

In addition to such modifying agents as the amino and similar nitrogen containing compounds given above, various others may be used. Among such compounds the following may be more specifically cited. These are classified as markedly effective, effective and slightly effective in the modification of crystalline habit.

A. Markedly effective:
  Ethylol dodecyl biguanide acetate
  Ethylol dodecyl biguanide hydrochloride
  Casein (dissolved in dilute $NH_4OH$)
  Casein (dissolved in dilute sodium tetraphosphate solution)
  Corn oil condensed with monoethylol cyanamide
  1.3 diethylol 5-butyl biguanide diacetate
  Di-ortho-tolyl guanidine
  Di-phenyl guanidine
  Di-xylyl guanidine
  (Di-ortho-tolyl guanidine)$_4SnCl_4$
  Ethylene diamine
  Ethylene diamine+acetic acid
  Ethylene diamine+$H_2SO_4$
  Ethylene diamine+HCl
  Glue
  Mixed diethylene triamine, triethylene tetramine, and tetraethylene pentamine+acetic acid
  Mixed diethylene triamine, triethylene tetramine, and tetraethylene pentamine
  Phenyl biguanide
  Soy bean fatty acids condensed with monoethylol cyanamide
  Soy bean protein (dissolved in dilute sodium tetraphosphate solution)
  Tetraethylene pentamine+acetic acid B. Effective:
  (Di-ortho-tolyl guanidine)$_2ZnCl_2$
  (Diaryl dithiophosphoric acids)+thiocarbanilide
  Ethylol dodecyl guanidine acetate
  Hexa or octadecyl guanidine acetate
  Sodium salt of diisopropyl dioctyl sulfosuccinic acid+pine oil
  $Al_2(SO_4)_2$(diphenyl guanidine)$_6$
  Castor oil fatty acids condensed with monoethylol cyanamides
  Cominaol (contains nitrogen)
  Cyanaceto guanamine
  α-2-cymel biguanide hydrochloride
  Cyanurea
  Ethylidene α-o-tolyl biguanide hydrochloride
  Furfural (mixed) xylol biguanide
  Gelatin
  Glutamic acid
  Glycine
  Guanidine thiocyanate
  β-Methoxy butyro guanamine
  Methylene o-tolyl biguanide
  Monoethylol cyanamide condensed with ethylene diamine
  Phenyl biguanide carbonate
  Pyridine: HBr
  α-Tertiary amyl phenyl biguanide hydrochloride
  α-Mixed xylyl biguanide hydrochloride C. Slightly effective:
  Acetamidine anthranilate
  p-Amino acetophenon
  Benzylidene α-tolyl biguanide hydrochloride
  Benzoguanamine-2-sulfonic acid
  Black Liquor Soap condensed with monoethylol cyanamide
  Sec. butyl phenyl biguanide hydrochloride
  o-Carbamyl benzoguanamine
  Coconut oil—Polyethylene amines condensed with same
  Corn sugar
  Dextrin
  Diethanol amine
  Dimethylol urea
  Ethylidene α-(sec. butyl phenyl) biguanide hydrochloride
  Ethylidene α-(o-tolyl) biguanide hydrochloride
  β-Ethoxy butyro guanamine
  Guanidine carbonate+acetic acid
  Guanidine carbonate
  Gum arabic
  Glutaro guanamine
  Hydrochloric acid
  Hexamethylene tetramine
  Hydroxyl amine hydrochloride
  Meta-nitro aniline
  Morpholine biguanide sulfate
  Nitric acid
  Pentaerythritol
  Phosphoric acid
  Pierolonic acid
  Piperazine hexahydrate
  Resorcinol
  Acid salts of the condensate of a fatty acid and ethylene diamine
  Water soluble glucosides+methyl cellulose+a wetting agent
  Sebaco guanamine
  Theanthrol, sodium lignin sulfonate
  α-β-Di-o-tolyl biguanide Thus, the general effect of such modification of crystal habit cannot be definitely attributed to any specific group and/or groups of elements, nor is it limited to either organic or inorganic compounds.

No completely satisfactory theoretical explanation of the manner in which these modifying agents function, other than that above given, can be offered. Moreover the modifying agents themselves do not fall within any recognized class, or appear to have any property in common other than their ability to change the crystal habit of nitroguanidines and substances similar therewith so as to yield extraordinarily small crystals.

It is to be understood that the examples, although drawn to the preparation of finely crystalline nitroguanidine are not to be deemed limited thereto. The invention in its broader aspects embraces the treatment, by the above described process, of various other organic compounds which are relatively soluble at higher temperatures such as those of boiling water and other boiling solvents and which when cooled form supersaturated solutions which readily precipitate out the solute in crystalline form. For these reasons the descriptive examples are to be taken as specific illustrations of the principles of the invention which is to be limited solely by the scope of the appended claims.

We claim:

1. The method of preparing finely divided nitroguanidine which comprises forming an aqueous solution of nitroguanidine at a temperature above 95° C. but below the decomposition temperature of nitroguanidine, adding from 0.3 to 3% of triethylene tetramine and cooling the solution to precipitate the nitroguanidine in a finely divided form.

2. The method of preparing finely divided nitroguanidine which comprises forming a saturated solution of nitroguanidine in boiling water, adding from 0.3 to 3% of triethylene tetramine and cooling the solution to precipitate the nitroguanidine in a finely divided form.

3. The method of preparing crystalline nitroguanidine of the order of at most 2.5 to 5 microns in width and 20 to 100 microns in length which comprises preparing a hot aqueous solution of nitroguanidine, adding from 1 to 3% of triethylene tetramine and cooling the solution to precipitate the nitroguanidine in a finely divided form.

GEORGE H. FOSTER.
EMIL F. WILLIAMS.